June 11, 1968 R. J. KLEIN 3,388,312
DUAL RESPONSE REGULATOR
Filed April 7, 1966 2 Sheets-Sheet 2
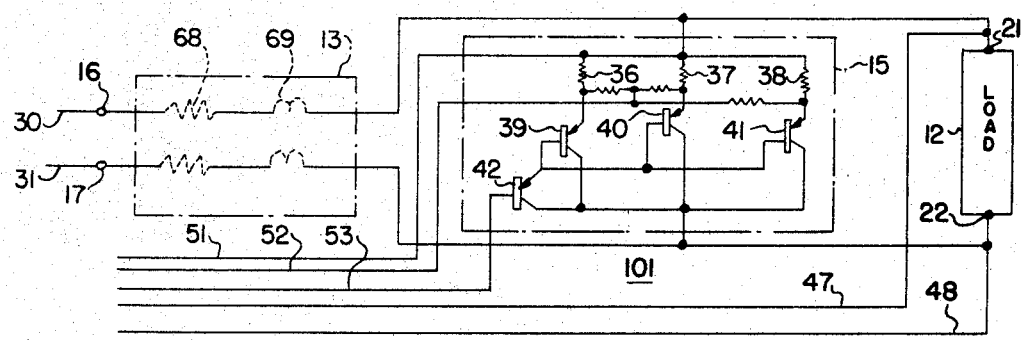
FIG. 2
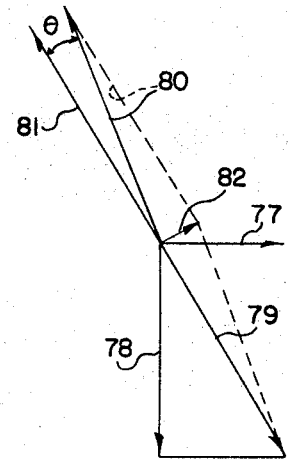
FIG. 3
FIG. 4
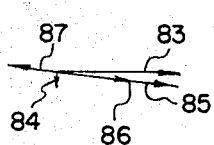
FIG. 5
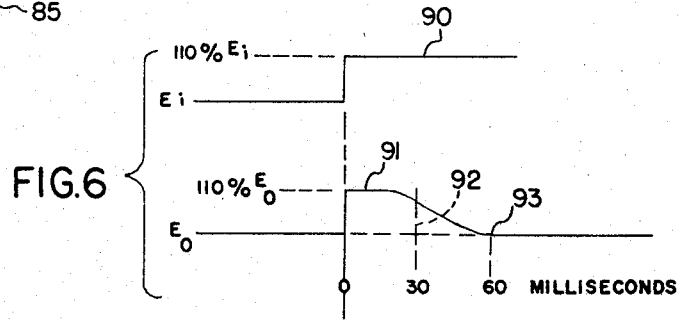
FIG. 6
INVENTOR
RICHARD J. KLEIN
BY *Woodling, Krost,*
*Granger and Rust,*
ATTORNEYS 3,388,312
DUAL RESPONSE REGULATOR
Richard J. Klein, Cuba, N.Y., assignor to Acme Electric Corporation, a corporation of New York
Filed Apr. 7, 1966, Ser. No. 540,943
19 Claims. (Cl. 321—18)

The invention relates in general to electrical regulators and more particularly to a regulator to regulate voltage or current supplied to a load by using two regulator circuits, one of faster response than the other.

The regulator system of the present invention may be used in many different applications and one particular application is with low voltage solid state circuits which require relatively high current. A particular application is with computer circuits wherein transistorized or solid-state integrated circuits are used and are packed with a high density of circuit components primarily to increase the speed at which the computer may operate. The transit time of electrons has become important in computers having circuits operating in the nanosecond range and as a result the solid state circuits are packed closely together to decrease the lead length to thus decrease the operating time of the computer. In such computer systems, there seems to be no space close to the loads to place the power supplies and consequently the power supplies are spaced a distance, for example, of five to twenty feet from the circuit boards which are the loads for the power supplies. The power supplies are then connected by a cable or transmission line to the circuit boards and the resistance and particularly the inductive reactance of such transmission line then becomes an increasingly large hurdle to overcome in order to supply a constant voltage for example, to the load. Also with the greater use of integrated circuits, lower voltages and higher currents are being demanded. Voltages in the range of 1 to 3 volts are common and currents up to 100 ampere per module of circuit boards are being used. At the same time the integrated circuits are capable of operating at high switching rates and the power supply is required to provide voltage regulation with only a small tolerance despite transient load current changes at high frequencies.

Accordingly an object of the invention is to provide a regulator system to meet the above requirements.

Another object of the invention is to provide a regulator system which includes first and second regulator circuits of different speeds of response.

Another object of the invention is to provide a regulator system with a large slow speed regulator circuit and a smaller higher speed regulator circuit, the smaller regulator circuit being controlled by a load condition and the larger regulator circuit being controlled by a condition of the smaller regulator circuit.

Another object of the invention is to provide a regulator system of high efficiency considering the low voltage being supplied.

Another object of the invention is to provide a regulator system with first and second regulator circuits of different speeds of response and with the control shifting automatically from the low speed response circuit to the high speed response circuit at a crossover frequency whenever the transient load current changes occur at frequencies in excess of the crossover frequency.

Another object of the invention is to provide a regulator system with a reactor providing a triple function of establishing filtering of the power supply ripple frequency, acting as a voltage divider for increased leverage of a shunt regulator action and acting as a voltage generator for high frequency changes in load current to help force a current change in a transmission line connected between the regulator system and the load.

The invention may be incorporated in a regulator system for supplying a voltage to a load through a transmission line having an input and an output, said regulator system comprising in combination, first and second regulator means, means to energize at least said first regulator means from a voltage source, means connecting the output of said first regulator means to the input of the transmission line, means connecting said second regulator means to the load to at least partially regulate one of voltage and current supplied to the load, first sensing means responsive to a load condition to control primarily said second regulator means, second sensing means responsive to one of voltage and current in said second regulator means to control the power output of said first regulator means to control the power output of said first regulator means, and means establishing control of said second regulator means at a faster rate than said first regulator means.

Other objects and a fuller understanding of the invention may be had by referring to the following description and claims, taken in conjunction with the accompanying drawings, in which:

FIGURE 2 is a partial schematic diagram of a modification of the regulator system of FIGURE 1;

FIGURES 3–5 are vector diagrams explaining the operation of the circuit of FIGURE 1; and FIGURE 6 is a graph of voltage versus time in the operation of the circuit of FIGURE 1.

Figure 1:
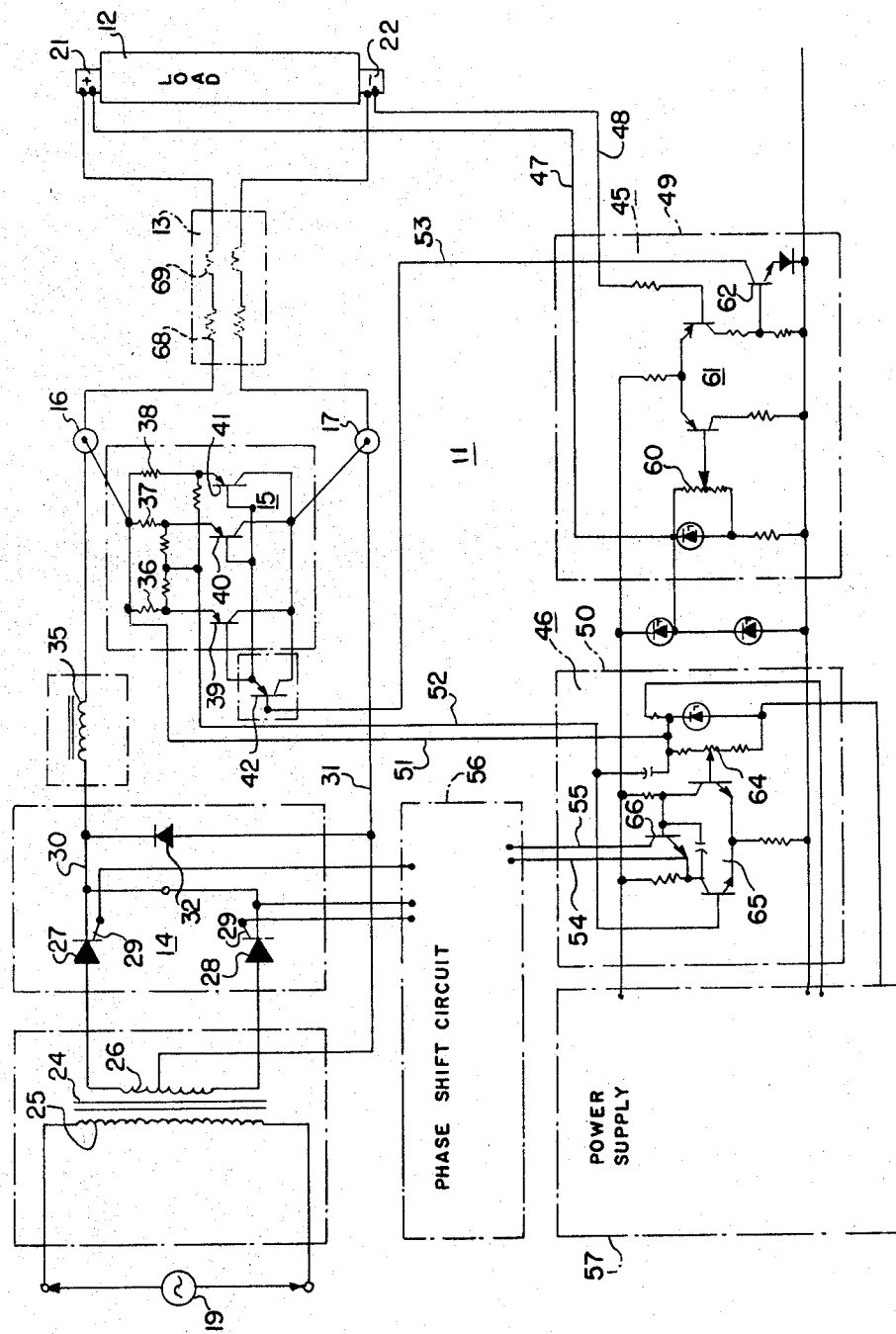
FIGURE 1 is a schematic diagram of a preferred embodiment of regulator system incorporating the invention.

FIGURE 1 is a schematic diagram of a preferred embodiment of a regulator system 11. This regulator system supplies energy to a load 12 through a cable or transmission line 13. The regulator system 11 includes first and second regulator circuits 14 and 15, respectively, and the regulator system 11 has output terminals 16 and 17. The regulator system 11 may be energized from any suitable voltage source, for example, an alternating voltage source 19. The first regulator circuit 14 may be considered the main or primary circuit within the system 11 to supply power to the output terminals 16 and 17. This regulator system 11 may be used with any type of load 12, for example, a computer system wherein the output terminals 16 and 17 cannot conveniently be physically located closely adjacent the load 12 so that the terminals 16 and 17 are contiguous with the load input terminals 21 and 22, respectively. Instead the cable 13 must be interposed to transfer the power from the regulator output terminals 16 and 17 to the load input terminals 21 and 22. It will be seen that the terminals 16 and 17 are the input terminals of the cable and the terminals 21 and 22 are the output terminals of the cable.

This regulator system 11 is designed to supply a direct current voltage to the load 12 and to maintain a substantially constant voltage input to this load 12 despite changing load current requirements and at transient load current changes at high frequency rates. The regulator circuit 14 is supplied through a step-down transformer having a primary winding 25 connected to the voltage source 19 and having a secondary winding 26. This may be a low voltage winding in the order of three to four volts and of high amperage capacity, say 80 to 100 amperes. The first regulator circuit 14 is connected to receive power from the secondary winding 26 and is shown as a controllable rectifier circuit. This first regulator circuit 14 includes solid state rectifiers in this case illustrated as silicon controlled rectifiers 27 and 28. Rectifiers 27 and 28 may be controlled by a voltage supplied to the gates 29 to supply a variable direct current voltage positive on a conductor 30 relative to a conductor 31. The conductor 30 is connected through an inductive reactor 35 to the first output terminal 16 of the regulator system 11. Conductor 31 is connected directly to the output terminal 17 of the regulator system 11. A free-wheeling diode 32 is connected to conduct current from the negative conductor 31 to the positive conductor 30 to maintain current flow in the load 12 and reactor 35 during periods when the controlled rectifiers 27 and 28 are nonconductive during a portion of each cycle of the source voltage.

The second regulator circuit 15 is preferably of smaller amperage and wattage capacity than the first regulator cricuit 14. It is also of higher speed response and one such regulator circuit of considerably higher speed response than the controlled rectifier circuit 14 is the shunt regulator circuit shown. This shunt regulator circuit 15 is connected across the regulator system output terminals 16 and 17. The shunt regulator circuit 15 includes generally a load resistor 36 and a power transistor 39 connected in series across the terminals 16 and 17. In one particular circuit constructed according to the invention there were three such load resistors 36, 37, and 38 and three transistors 39, 40, and 41 with the three series combinations connected in parallel in order to carry the required amperage. An amplifying transistor 42 also is connected to control the conductivity of each of the three main transistors 39–41. In operation the shunt regulator circuit 15 shunts a variable amount of current derived from the first regulator circuit 14 between the regulator output terminals 16 and 17 generally equal and opposite to the current changes in the load 12 so as to maintain a substantially constant voltage at the load input terminals 21 and 22.

First and second sensing means 45 and 46 are provided in the regulator system 11. The first sensing means 45 includes a first control circuit 49 and conductors 47 and 48 connected to the load 12 to be responsive to a condition of this load. In FIGURE 1 this load condition is shown to be load input voltage. The second sensing means 46 also includes a second control circuit 50 and conductors 51 and 52 which are responsive to a condition of the second regulator circuit 15. In this circuit of FIGURE 1 the conductors 51 and 52 are shown connected to be responsive to the average current through this second regulator circuit 15 by being effectively connected across each of the load resistors 36, 37, and 38. This connection is like the connection to a meter shunt which measures the voltage across the shunt to thus be responsive to the current flow therethrough. The first sensing means 45 is connected in a high speed responsive loop via conductor 53 to control the shunt regulator 15. The second sensing means 46 is connected in a low speed responsive via output conductors 54 and 55 through a phase-shift circuit 56 to control the output of the first regulator circuit 14. A power supply 57 may be energized from the alternating current source 19 to supply reference and operating voltages for the first and second control circuits 49 and 50.

The first sensing means 45 receives a voltage proportional to the load input voltage on conductors 47 and 48. This voltage is compared with a voltage reference from a reference potentiometer 60 obtained from the power supply circuit 57 and amplified in a differential amplifier 61 and an amplifier 62 and applied through conductor 53 to control the conductivity of amplifier 42 and hence of the power transistors 39–41. The second sensing means 46 is supplied with a voltage from conductors 51 and 52 which voltage is responsive to a condition of the second regulator cricuit 15. In this case this condition is the average current flow through this regulator circuit 14. This sensed voltage is compared with a reference voltage from reference potentiometer 64, the difference voltage is amplified by the differential amplifier 65 and another amplifier 66 and applied to the conductors 54 and 55.

The cable or transmission line 13 may be carefully constructed to have a minimum of inherent resistance 68 and inductance 69, but nevertheless in actual circuits it has been determined that a certain amount of inductance 69 is inherently present. Special transmission lines may be used of laminated insulated conductors with a first set of alternate conductors being connected to the positive terminal 16 and the other set of alternate conductors being connected to the negative terminal 17. It has been found that this minimizes the inherent inductance but nevertheless in practical cables capable of handling from 30 to 100 amperes it has been found that an inductance of about .006 microhenry still exists per foot of length. At steady state DC conditions reactance does not result in any voltage drop, but because the load 12 may be a computer system operating at high switching rates approaching 20,000 Hertz, or 20,000 cycles per second of alternating current or transient load current changes, this small amount of inductance will result in a reactive voltage drop of .754 volt in a ten foot long cable at 100 amperes, for example.

*Operation*

Assuming that the transformer 24 is energized and the load 12 is being supplied with a constant voltage, then the load voltage is being sensed by the conductors 47 and 48. This voltage is compared with a reference voltage at the reference potentiometer 60, the difference voltage is amplified and used to control the conductivity of the high speed power transistors 39–41. These transistors are capable of operating satisfactorily up to a high speed switching rate in the order of 20 kHz. Under steady state conditions in the above example, the shunt regulator 15 will be shunting or bleeding off about 10 amperes through the load resistors 36–38. Accordingly the first regulator circuit 14 will be supplying 90 amperes, 80 amperes to the load and 10 amperes to the shunt regulator circuit 15. The conductors 51 and 52 will sense the average current flowing through the load resistors 36–38 which in this above example is 10 amperes. The voltage across these shunt resistors is a function of the current flow therethrough and this voltage is compared with the reference voltage from reference potentiometer 64. The difference voltage is amplified and controls the phase-shift circuit 56 to turn on the controlled rectifiers 27 and 28 just sufficiently to supply a voltage of sufficient magnitude to supply the aforesaid 90 amperes.

Now assume that the load current increases slowly at a rate of say 1 Hz. As the load current increases the load voltage will drop slightly and the first control circuit 49 will sense this decreasing load voltage. A signal is transmitted on conductor 53 to slightly turn off the transistors 39–41. This decreases the current flow through resistors 36–38. The voltage thereacross accordingly decreases which is sensed by the second control circuit 50 and this, acting through the phase-shift circuit 56, slightly turns on the controlled rectifiers 27 and 28 to increase the effective voltage output and accordingly the current supplied to the regulator system output terminals 16 and 17. This increase in current will be just enough to satisfy the increased requirement of the load 12 and hence to return the load input voltage to its regulated condition and to return the regulator circuit 14 to its average current condition.

Now if the load is suddenly switched in its load current requirements, such switching may be at a high alternating current or transient current rate. For example, the load 12 may be a computer system having perhaps 20 circuit boards per module. An operator might grasp two of these circuit boards and pull them out of their plug-in connections at the same instant. This would thus be a decrease of load current requirements by about 10 percent because of the approximately 10 percent increased load impedance. This could result in a transient load current change at the frequency of 20 kHz. and the regulator system 11 is designed to provide regulation of the load input voltage at frequencies up to at least 20 kHz. With this rapid change in load current, the load input voltage would rise rapidly and this would cause the high speed power transistors 39–41 to turn on for approximately full conduction so that the shunt resistors 36–38 would absorb approximately 20 amperes. The shunt regulator circuit 15 will respond at least at this 20 kHz. rate to quickly absorb an extra amount of current proportional to the drop in load current to try to maintain the load voltage substantially constant. The rapid increase in current through the resistors 36–38 will be sensed by the second control circuit 46. This acts through the phase-shift circuit 36 to turn off the controlled rectifiers 27 and 28. However, this action is in a low speed responsive loop because the SCRs will require approximately three or four cycles of the voltage source 19 to adjust themselves to the new rate of current flow. If this source 19 is a 60 cycle voltage source, for example, this will be in the order of 1/15 or 1/20 of a second. This is much too slow to achieve the desired response time of about .05 millisecond, dictated by the 20,000 Hz. desired frequency response. Accordingly it is the high speed response shunt regulator 15 which takes care of the sudden transient changes in load current and it is the low speed response regulator circuit 14 which is responsive to the average current through the second regulator circuit 15 which gradually adjusts itself to keep the second regulator circuit 15 at an average value at the midpoint of its regulated range. In the above example the second regulator circuit 15 may swing between 0 and 20 amperes with a mid-point range of 10 amperes of average current.

During steady state conditions the regulator system output terminals 16 and 17 supply sufficient voltage to overcome the IR drop in the cable 13. Also at these steady state conditions there is no IX drop. However, during rapid transient load current changes there is a very definite IX drop in the cable 13. As stated above, this may be in the order of .75 volt. Let it be assumed that the operator of the load 12 suddenly plugs in two out of twenty circuit boards to cause a rapid load resistance decrease of about 10 percent which transient change is at a frequency in the order of 20 kHz. The load voltage rapidly decreases, the high speed first sensing means 45 quickly turns off the transistors 39–41 and the regulator output voltage at terminals 16 and 17 tries to rise to cause more current to flow through the cable to the load. However, the inherent inductance 69 in the cable 13 causes a transient IX drop which opposes the increased current. This inductive reactance 69 of the cable 13 develops a voltage proportional to $Ldi/dt$ which is positive at the terminal 16. However, at the same time the suddenly decreased bleed off or shunt current through shunt regulator circuit 15 tries to decrease the current from the controlled rectifiers 27 and 28 through the reactor 35. The inductive reactance of this reactor 35 opposes this sudden decrease of current by developing a voltage proportional to $Ldi/dt$ which is positive at the terminal 16. Accordingly the reactive voltage drop in the cable 13 is opposed by an opposite polarity reactively generated voltage in the reactor 35. This reactive voltage generated in reactor 35 thus is available to force extra current flow through the cable 13 despite the reactive voltage drop therein. This means that the load input voltage is forced by the reactive voltage of reactor 35 and hence the load input voltage remains substantially constant. The above describes a most important feature of the invention because it enables the entire regulator system 11 to have a very fast response time up to 20 kHz. to maintain substantially constant the regulated voltage to the load 12 despite the fact that the cable 13 has an inherent inductive reactance.

The reactor 35 has a second function of providing filtering for the ripple frequency from the controlled rectifiers 27 and 28. These are shown in a full-wave rectifier circuit and accordingly with a 60 cycle input voltage this ripple frequency would be at 120 Hz. This reactor 35 filters this ripple frequency. A third important function of the reactor 35 is to act in a manner similar to a series resistor or series impedance in a shunt regulator system. In an ordinary shunt regulator the rectifiers 27 and 28 would not be controlled rectifiers and the reactor 35 would be a series resistor having perhaps one or two volts IR drop. This would act in conjunction with a shunt regulator similar to the regulator circuit 15 which would include a resistor in series with a transistor. Such series resistor in place of the reactor 35 establishes a voltage drop across both the series resistor and the shunt resistor. Then upon load current changes, for example, a load current increase, the transistor turns off somewhat to decrease the voltage across the shunt resistor and this decreases the voltage across the series resistor because it has less current drain through the shunt resistor. Accordingly with a lowered voltage drop across the series resistor, more voltage is available to supply the load and maintain the voltage thereof substantially constant. If such a series resistor were not provided in a shunt regulator system, then there would need to be excessive current swings or excursions through the shunt resistor and transistor in order to provide sufficient IR drop in the inherent impedance of the rectifiers themselves and the connecting conductors in order to try to maintain substantially constant voltage to the load 12. Thus such a series resistor provides leverage to make the change in current through the shunt resistor more effective.

In the present system there is no need for a series resistor and its inherent voltage and power absorbing characteristics. This is because the high speed response loop of the first sensing means 45 establishes the necessary shunt current flow through the shunt regulator circuit 15, and the second sensing means 46 senses the average current in the second regulator circuit 15 to establish the ouput from the first regulator circuit 14. This is for steady state conditions. Now under transient current changes, and especially those at high frequencies, there is a reactive voltage drop across the reactor 35 which provides the necessary leverage to provide more effective operation of the shunt regulator 15. Thus for transient current changes there will be an IX drop across the reactor 35 as well as an IR drop in resistor 36–38 just as there was a voltage drop across the series resistor in the aforementioned description of a prior art shunt regulator system.

The above describes three important functions of the reactor 35. The first function described above was to provide a forcing voltage to the cable 13 of a polarity opposite the IX drop in the cable 13 for transient current changes. The reactor 35 should have an inductance of a certain minimum frequency in order to satisfactorily perform this function. This inductance value is the amount of inductance required for the transmission line resistance and inductance compensation. The reactor should also be designed to have a certain minimum value according to the maximum source voltage ripple current which the shunt regulator circuit 15 is to handle. Also the reactor 35 should be designed to have a certain minimum value in accordance with the amount of current which the shunt regulator circuit 15 is to handle for the expected line voltage changes. In the above example, this was plus or minus 10 percent. To determine the first of these minimum inductance values required for the reactor 35, the following factors must be considered. It may be considered that the reactor requires a constant current to flow into the combination of the load 12 and shunt regulator circuit 15. When the load 12 requires more current, the shunt regulator senses a tendency for the load voltage to drop and releases enough current to supply the load requirement. When the shunt turns off that amount of current, the reactor senses it as an attempt to reduce its constant value of current. Because of the inertia characteristics of the reactor 35, the reactor does not permit this change rather it produces a voltage E equals $-L\,di/dt$ which forces the extra current through the cable 13 and into the load 12, satisfying the requirements of the load.

The reactor 12 should have an inductance value large enough at a crossover frequency to supply a voltage substantially equal to and opposite to the IZ drop in the cable 13. This is illustrated in FIGURE 3 wherein the vectors 71, 72, and 73 are the IR, IX, and IZ drops, respectively, of the cable. Vector 74 is the vector representing the regulation at the load terminals 21 and 22 and vector 75 is the $L\, di/dt$ voltage generated in the reactor 35 at the crossover frequency. This crossover frequency is determined by the speed of response of the low speed response loop of the regulator circuit 14. For example, this might be $\frac{1}{20}$ of a second if it takes three cycles of the 60 Hz. source voltage for the regulator circuit 14 to restabilize at a new current value after a change in load requirements. FIGURE 4 shows the vectors of voltages in the circuit for some higher frequency than the crossover frequency. If the load current requirements are suddenly changed at a higher frequency rate, then FIGURE 4 illustrates these voltage factors. Vectors 77, 78 and 79 illustrate the IR, IX, and IZ drops, respectively, in the cable. Vector 80 illustrates the $L\, di/dt$ or forcing voltage developed in the reactor 35. An angle $\theta$ is an angle between the vector 80 and a vector 81 which is the ideal supply terminal correction which ideally should be supplied from the reactor 35. The angle $\theta$ represents the regulation of the entire system 11 and represents the transit time of the corrective signal from the conductors 47 and 48 until current is supplied by the shunt regulator circuit 15 at the regulator output terminals 16 and 17. Because the vectors 79 and 80 are not exactly 180 degrees apart there is not a perfect cancellation. The vector resultant of vectors 79 and 80 is the regulation vector 82. This accordingly limits the maximum frequency at which the regulator system 11 will satisfactorily operate.

FIGURE 5 illustrates the vectors available at low frequencies, below the crossover frequency. In this case vectors 83, 84 and 85 represent the IR, IX, and IZ drops, respectively, in the cable 13. Vector 86 represents the regulation vector and vector 87 represents the $L\, di/dt$ voltage available from the reactor 35. It will be noted that in the case of FIGURE 5 the vector 87 is not sufficiently large to be equal to the IZ drop vector 85. However in this case it is not necessary for the vector 87 to be this large because this condition illustrated is that below the crossover frequency and accordingly the slow responsive loop controlling the first regulator circuit 14 will provide sufficient voltage to control the slowly changing load current requirements.

The FIGURES 3, 4, and 5 help illustrate why the reactor must be large enough in inductance value at some minimum frequency, determined by the maximum frequency response of the slow loop regulator circuit 14, to generate a voltage equal to the IZ drop of the cable 13. This minimum frequency is called the crossover frequency, at which the dominant control function crosses over from the fast loop or shunt regulator circuit 15 to the slow loop first regulator circuit 14. In general it can be stated that the reactor 35 has a minimum value determined by the crossover frequency and its associated $L\, di/dt$ by the resultant of $$E = \sqrt{IR^2 + IX^2}$$

where IR may be dominant. From this formula it may be determined that the minimum inductance of the reactor 35 is equal to $$\sqrt{IR_c^2 + IX_c^2} \cdot \frac{1}{di/dt}$$

at the crossover frequency, where $R_c$ and $X_c$ are the resistance and inductive reactance of the cable 13.

When the line voltage from the source 19 is stepped up or down, it will apply a voltsecond area to the reactor 35 which is equal to the voltage change multiplied by the response time of the slow regulator 14. The change in current will be derived from the equation $\int E\,dt = \int L\,dt$, or the voltsecond area equals inductance L times the change in average current. FIGURE 6 illustrates a graph of voltage versus time to show a typical response time for the 60 Hz. slow regulator 14. In FIGURE 6 curve 90 illustrates the input volts which at time 0 steps up 10 percent. Curve 91 illustrates the average voltage out of the controlled rectifier 14. At time 0 the curve 91 takes a sudden jump increasing by 10 percent. At the time point 92 of 30 milliseconds, the regulator output voltage will begin to drop appreciably and at time point 93 of 60 milliseconds, the regulator 14 output voltage will have reduced about to normal, assuming about three or four cycles of the source voltage 19 is required for stabilization of the low speed regulator circuit 14.

The voltseconds area is:

$$E \times \tfrac{1}{10} \times 30 \times 10^{-3} + \tfrac{1}{2}\,(E \times \tfrac{1}{10} \times 30 \times 10^{-3}) =$$

$$\tfrac{9}{2} E \times 10^{-3} \text{ voltseconds}$$

$$\Delta I = \frac{\tfrac{9}{2} E \times 10^{-3} V-S}{L}$$

For example, if we had $6.28 \times 10^{-3}\, H$ and $E = 0.4$ v.

$$\frac{\tfrac{9}{2} \times 0.4 \times 10^{-3}}{6.28 \times 10^{-3}}$$

$\Delta I$ would be
$\Delta = 0.2875$ amperes

The regulator system 11 of the present invention has very good efficiency compared to either the prior art shunt regulator or series regulator. In a prior art series regulator one would normally find a series transistor, for example, in series in the conductor 30 in place of the reactor 35. Also the rectifiers 27 and 28 would normally be of the uncontrolled type. By varying the conductivity of the series transistors, one could regulate the voltage supplied to the load 12. In such a series regulator system there could be about 1.2 volts at the load, .3 volt IR drop in the cable, .38 volt IX drop in the cable during transient changes at high frequency, 2.0 volt drop in the series transistors and 1.0 volt drop in the uncontrolled rectifier. This would give a total of 4.88 volts drop at minimum line voltage or 5.86 volts at maximum line voltage, considering a plus or minus 10 percent variation in line voltage. Considering the average AC input voltage at the transformer winding 26, this would be 5.37 volts and accordingly the efficiency would be 1.2 divided by 5.37 or 22.35 percent.

In one practical circuit made in accordance with the schematic diagram of FIGURE 1 the regulator system 11 supplied 1.2 volts at 100 amperes to the load 12. To accomplish this the regulator circuit 14 supplied a maximum of 110 amperes and the shunt regulator circuit 15 bled off a maximum of twenty amperes, with an average current therethrough of about ten amperes under steady state conditions. The inductive reactor 35 had a voltage drop of .3 and the cable had a resistive voltage drop of .3. The controlled rectifiers 27 and 28 provided a voltage drop of about 1.25 volts for a total of 3.05 volts minimum and 3.66 volts maximum. This maximum voltage comes at a high source voltage 19, assuming that this voltage source may vary plus or minus 10 percent from its nominal value. This means an average voltage of 3.35 volts AC for the voltage of the transformer secondary winding 26. Assuming 10 amperes average current through the transistors 39–41, the efficiency equals 1.2 volts times 100 amperes divided by 3.35 volts times 110 amperes for 32.6 percent efficiency. This is a very high efficiency considering the voltage supplied to the load being low in proportion to the inherent voltage drop in the controlled rectifiers 27 and 28. This compares with about 13 to 20 percent efficiency for the usual series or shunt regulators which would be a prior art method of supplying regulated power to the load 12.

In a prior art shunt regulator operating under the same conditions, one could have 1.2 volts supplied to the load, .3 volt IR drop in the cable, .38 volt IX drop in the cable during transient changes at high frequency, 2.0 volts drop in the series resistor and 1.0 volt drop in the uncontrolled rectifier. This would give a total of 4.88 volts drop at minimum line voltage or 5.86 volts at maximum line voltage, considering a plus or minus 10 percent line voltage variation. Considering the average AC input voltage at the transformer winding 26, this would be 5.37 volts. Also assuming 40 amperes average shunt current, the efficiency would be 1.2 divided by 5.37 times 1.4 or 16.0 percent.

This shows that the regulator system 11 of the present invention has far greater efficiency than either the usual series regulator or the usual shunt regulator. In addition both the shunt regulator and series regulator would require filter capacitors of large capacity to filter the ripple current and in the present invention the reactor 35 performs this function without need for filter capacitors.

FIGURE 2 shows a modified regulator system 101 and only a portion of this system 101 is shown, namely the portion to the right of the first regulator output terminals 16 and 17. In this regulator system 101 the cable 13 is again shown connected directly to these regulator output terminals 16 and 17. However, the second regulator circuit 15 is shown connected across the output terminals 21 and 22 of the cable 13. The regulator circuit 15 may again be a shunt regulator circuit shunting a variable amount of current so that this regulator circuit 15 does not require a separate power supply. The regulator circuit 15 again includes the series resistors 36–38 and the transistors 39–42. The current sensing leads 51 and 52 are again effectively connected across the resistors 36–38 to sense the average current therethrough and the conductor 53 is connected to control the conductivity of the transistors 39–42. These conductors would connect onto the rest of the regulator system as shown in FIGURE 1.

In a circuit actually constructed according to FIGURE 2, the regulator circuit 15 was able to regulate the voltage supplied to the load terminals 21 and 22. The regulator circuit 15 may be mounted on a small circuit board, for example, mounted in a rack directly at this load 12 which may be a computer system module of perhaps 20 circuit boards requiring 80 to 100 amperes. Because the regulator circuit 15 is directly at the load terminals, it is able to regulate the load voltage very closely and despite the reactance 69 in the cable 13. Accordingly in this case the reactor 35 is not needed for its purpose of reactive voltage cable forcing, or in other words the function of developing a voltage opposite in polarity to the IZ drop in the cable during transient load current changes. The reactor 35 may still be used for its two other functions of filtering the ripple current and providing a leverage to limit the current excursions through the shunt regulator circuit 15 upon load current changes.

The example was given above that a way in which a 10 percent sudden load change could be effected was to pull-out or plug-in two of twenty circuit boards. This can happen, but is not a usual type of load change. The normal high frequency load changes are caused by multiple flip flops, multivibrators and switching circuits, incorporated in the integrated circuit boards, switching at fast rates (above 20 kHz.) causing all kinds of random demands of load current. Capacitors may be connected across the load to handle all the high frequency changes but in the range of 20 to 40 kHz. it becomes more practical to try to regulate the current supplied to meet the demands rather than filter out the incipient voltage regulation with capacitors. The 20 kHz. and lower frequencies mentioned above are random loading patterns, beat frequencies of the high frequency switching and seem to follow a statistical pattern of being limited to about 5 percent to 10 percent of the maximum load current being consumed in a typical computer load. Much load switching is being done in the nanosecond range but only the low frequency (20 kHz.) components of the load change spectrum must be handled by the regulator.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and scope of the invention as hereinafter claimed.

What is claimed is:

1. A regulator system for supplying a voltage to a load through a transmission line having an input and an output,
    said regulator system comprising, in combination, first and second regulator means,
    means to energize at least said first regulator means from a voltage source,
    means connecting the output of said first regulator means to the input of the transmission line,
    means connecting said second regulator means to the load to at least partially regulate one of voltage and current supplied to the load,
    first sensing means responsive to a load condition to control primarily said second regulator means,
    second sensing means responsive to one of voltage and current in said second regulator means to control the power output of said first regulator means,
    and means establishing control of said second regulator means at a faster rate than said first regulator means.

2. A dual response regulator system for supplying a voltage to a load through a transmission line having an input and an output,
    said regulator system comprising, in combination,
    first and second regulator circuits,
    means to energize at least one of said circuits from a voltage source,
    means connecting the output of said first regulator circuit across the input to the transmission line,
    means connecting said second regulator circuit to the load to control the voltage supplied thereto,
    first and second sensing means,
    said first sensing means sensing one of voltage and current of the load,
    means connecting said first sensing means to control said second regulator circuit in a high speed responsive loop for transient load current changes at frequencies higher than said crossover frequency,
    said second sensing means sensing one of voltage and current of said second regulator circuit,
    and means connecting said second sensing means to control said first regulator circuit in accordance with the sensed voltage or current in said second regulator circuit in a low speed responsive loop for transient load current changes at frequencies less than a crossover frequency.

3. A regulator system as claimed in claim 2 wherein a substantially constant direct current voltage is supplied to the load.

4. A regulator system as claimed in claim 2 wherein said first regulator circuit includes a transformer adapted to be energized from an alternating voltage source,
    a controlled rectifier energized from said transformer, and said second sensing means sensing the average current through said second regulator circuit to control said controlled rectifier.

5. A regulator system as claimed in claim 4 wherein said crossover frequency is in the order of one-third of the frequency of the alternating voltage source.

6. A regulator system as claimed in claim 2 wherein said first sensing means senses the voltage across the input to the load and controls the conductivity of said second regulator circuit.

7. A regulator system as claimed in claim 2 wherein said second regulator circuit is a shunt regulator connected across the input to the transmission line,
    said second regulator providing a variable shunt impedance to said first regulator circuit to shunt some of the current from the load through the second regulator circuit, and an inductive reactor connected in series between said first regulator circuit and the input to the transmission line.

8. A regulator system as claimed in claim 7 wherein the inductive reactance of the transmission line establishes a voltage substantially equal and opposite to the voltage established across said inductive reactor for transient load current changes at the crossover frequency.

9. A regulator system as claimed in claim 2 wherein said second regulator system is connected across the output of the transmission line at the input to the load.

10. A dual response regulator system for supplying a substantially constant voltage to a load through a transmission line, said transmission line having a given inductive reactance, said regulator system comprising, in combination, a transformer adapted to be energized from an alternating voltage source, a secondary winding on said transformer, a controlled rectifier connected to said secondary winding, an inductive reactor connected in series between said rectifier and the input of the transmission line, a second regulator circuit connected across the input of the transmission line, first and second sensing means, said first sensing means being a voltage sensing means connected across the output terminals of the transmission line and connected to control said second regulator circuit to control the current between the output terminals thereof in a high speed responsive loop to compensate for transient load current changes at frequencies higher than said crossover frequency, said second sensing means being a current sensing means sensing the average current through said second regulator circuit between the input terminals of the transmission line, and means connecting said second sensing means to control said controlled rectifier in accordance with the average current in said second regulator circuit in a low speed responsive loop for transient load current changes at frequencies less than a crossover frequency.

11. A regulator system as claimed in claim 10 wherein said transformer is a step-down transformer and said secondary winding is a low-voltage secondary winding.

12. A regulator system as claimed in claim 10 wherein said low speed responsive loop requires approximately three cycles of the alternating voltage source to stabilize at a new average current value therefrom to establish said crossover frequency in the order of ⅓ the source frequency.

13. A regulator system as defined in claim 10 wherein said inductive reactor has an inductive reactance value at said crossover frequency substantially equal to the inductive reactance of the transmission line at the crossover frequency to force current flow through the transmission line into the load upon load current increases.

14. A regulator system as defined in claim 10 wherein said second regulator circuit is a shunt regulator circuit absorbing variable amounts of power from the controlled rectifier.

15. A regulator system as defined in claim 14 wherein said shunt regulator system includes a resistor and a power transistor connected in series to control the load current flow between the input terminals of the transmission line, and said second sensing means is a current sensing means sensing the average current through said resistor.

16. A regulator system as defined in claim 10 wherein said second regulator circuit is of smaller wattage capacity and of higher speed response than said controlled rectifier.

17. A regulator system as defined in claim 10 wherein said inductive reactor performs the triple functions of filtering for the controlled rectifier, establishing a voltage drop thereacross for transient load current fluctuations to aid the shunt regulator function and establishing a voltage proportional to $L\, di/dt$ for forcing a current through the transmission line proportional to load current changes.

18. A regulator system as defined in claim 10 wherein said second regulator circuit is a shunt regulator connected across the output of the transmission line at the input of the load.

19. A dual response regulator system to control a substantially constant voltage to a load through a cable having resistance and inductive reactance comprising, in combination, a step-down transformer having a primary winding connectable to an AC source, a secondary winding on said transformer, a first regulator in said system including a controlled rectifier connected to said secondary winding, an inductive reactor connected in series between the output of said controlled rectifier and the input terminals of the cable, a second shunt regulator in said system connected across the input terminals of the cable, said shunt regulator including a resistor connected in series with a power transistor to shunt some of the current across the input terminals of the cable, a control circuit for said shunt regulator and having input terminals, control conductors connected from the output terminals of the cable at the input to the load and connected to control said shunt regulator control circuit for high speed control of said dual response regulator above a crossover frequency, a control circuit for said controlled rectifier, means responsive to the average current through said resistor in said shunt regulator to control said control circuit for said controlled rectifier for low speed response below said crossover frequency, said series inductive reactor having an inductance value sufficient to establish a voltage thereacross equal and opposite to the reactance voltage drop in the cable at said crossover frequency, whereby said low speed control circuit of said controlled rectifier maintains an average current through said resistor and consequently into the load and high frequency changes of load current control said high speed control circuit to control said shunt regulator for rapid changes of load current at frequencies above said crossover frequency and whereby said series inductive reactor performs a triple function of filtering for said controlled rectifier, establishing a voltage drop thereacross for AC fluctuation in load current and establishing a voltage proportional to $L\, di/dt$ for a forcing voltage applied to the cable proportional to load current changes.

References Cited

UNITED STATES PATENTS 3,124,698   3/1964   Semmer et al.    307—57
3,174,094   3/1965   Farnsworth et al.    323—18

JOHN F. COUCH, *Primary Examiner.*
WARREN E. RAY, *Examiner.*
W. M. SHOOP, *Assistant Examiner.*